(12) United States Patent
Hansen et al.

(10) Patent No.: US 10,291,164 B2
(45) Date of Patent: May 14, 2019

(54) METHOD AND A SYSTEM FOR OPERATING A VARIABLE SPEED MOTOR

(71) Applicant: FMC Kongsberg Subsea AS, Kongsberg (NO)

(72) Inventors: Morten Thule Hansen, Drammen (NO); Harald Bjørn Ulvestad, Asker (NO); Dimitrios C. Stellas, Vettre (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 15/741,760

(22) PCT Filed: Jun. 9, 2016

(86) PCT No.: PCT/EP2016/063169
§ 371 (c)(1),
(2) Date: Jan. 3, 2018

(87) PCT Pub. No.: WO2017/005451
PCT Pub. Date: Jan. 12, 2017

(65) Prior Publication Data
US 2018/0205337 A1    Jul. 19, 2018

(30) Foreign Application Priority Data

Jul. 3, 2015 (NO) .................................. 20150872

(51) Int. Cl.
*H02P 21/20* (2016.01)
*H02P 21/24* (2016.01)
(Continued)

(52) U.S. Cl.
CPC .......... *H02P 21/20* (2016.02); *F04D 15/0066* (2013.01); *F04D 25/0686* (2013.01); *F04D 31/00* (2013.01); *H02P 21/24* (2016.02)

(58) Field of Classification Search
CPC .......... H02P 21/24; H02P 21/22; H02P 21/20; F04D 15/0066; F04D 25/0686; F04D 31/00
See application file for complete search history.

(56) References Cited

U.S. PATENT DOCUMENTS 3,683,249 A * 8/1972 Shibata .................... B60K 6/48
290/30 R
3,789,281 A * 1/1974 Shibata .................... B60K 6/26
318/696
(Continued)

FOREIGN PATENT DOCUMENTS

WO    WO 2013/039403 A1    3/2013
WO    WO 2013/039404 A1    3/2013
WO    WO 2015/055444 A1    4/2015

*Primary Examiner* — Thai T Dinh (57) ABSTRACT

The present invention relates to a method of operating a variable speed motor (1) drivingly connected to a multiphase pump (3) via a shaft (4). A power transmission device (20) for transmission of power to the variable speed motor (1) from a power source (2) is provided. A first controller (30) is provided between the power source (2) and the power transmission device (20) for controlling the variable speed motor (1). A speed parameter (n) representative of a motor speed ($n_{mot}$) is calculated in the first controller (30). A torque reference (Tref) is received in the first controller (30). A second controller (40) is provided in communication with the first controller (30) for compensation of the effect of the power transmission device (20). The second controller (40) comprises a representation of a compensation torque ($\Delta T_{map}$) as a function of a mapped torque parameter ($T_{map}$) and a mapped speed parameter ($n_{map}$). The second controller (40) is arranged to receive the torque reference ($T_{ref}$) and the speed parameter (n) from the first controller (30). The compensation torque ($\Delta T_{map}$) for the speed parameter (n) and torque reference ($T_{ref}$) is calculated in the second controller (40) based on the said representation. Then, the (Continued)

first controller (30) is arranged to receive the compensation torque ($\Delta T_{map}$) from the second controller (40) and the first controller is controlling the variable speed motor (1) based on the received compensation torque ($\Delta T_{map}$), to keep the difference between the torque reference ($T_{ref}$) and the shaft torque ($T_{mot}$) as small as possible.

12 Claims, 8 Drawing Sheets

(51) Int. Cl.
    *F04D 15/00*     (2006.01)
    *F04D 25/06*     (2006.01)
    *F04D 31/00*     (2006.01)

(56) References Cited

U.S. PATENT DOCUMENTS

| | | | | |
|---|---|---|---|---|
| 5,644,200 | A * | 7/1997 | Yang | B60K 6/38 |
| | | | | 180/65.25 |
| 2004/0064292 | A1* | 4/2004 | Beck | E21B 43/126 |
| | | | | 702/182 |
| 2012/0319628 | A1* | 12/2012 | Rongve | H02P 23/14 |
| | | | | 318/400.02 |
| 2014/0375234 | A1 | 12/2014 | Kim et al. | |

* cited by examiner

METHOD AND A SYSTEM FOR OPERATING A VARIABLE SPEED MOTOR

FIELD OF THE INVENTION

The present invention relates to a method and a system for operating a variable speed motor drivingly connected to a multiphase pump via a shaft.

BACKGROUND OF THE INVENTION

A subsea multiphase pump is an important part of subsea processing equipment used for subsea processing of well fluids from subsea oil and/or gas wells. A subsea multiphase pump comprises a variable speed electrical motor, such as a permanent magnet synchronous motor (PMSM).

Such motors are normally connected to a power source via a variable speed drive (VSD), where the purpose of the VSD is to control the motor to keep its torque at a desired level (often referred to as torque control). Hence, by means of the VSD, the torque is kept close to a torque reference value even if the load of the motor is changing.

The motor voltage and motor current are used by the VSD control algorithm in order to calculate the actual torque of the motor.

Figure 1:
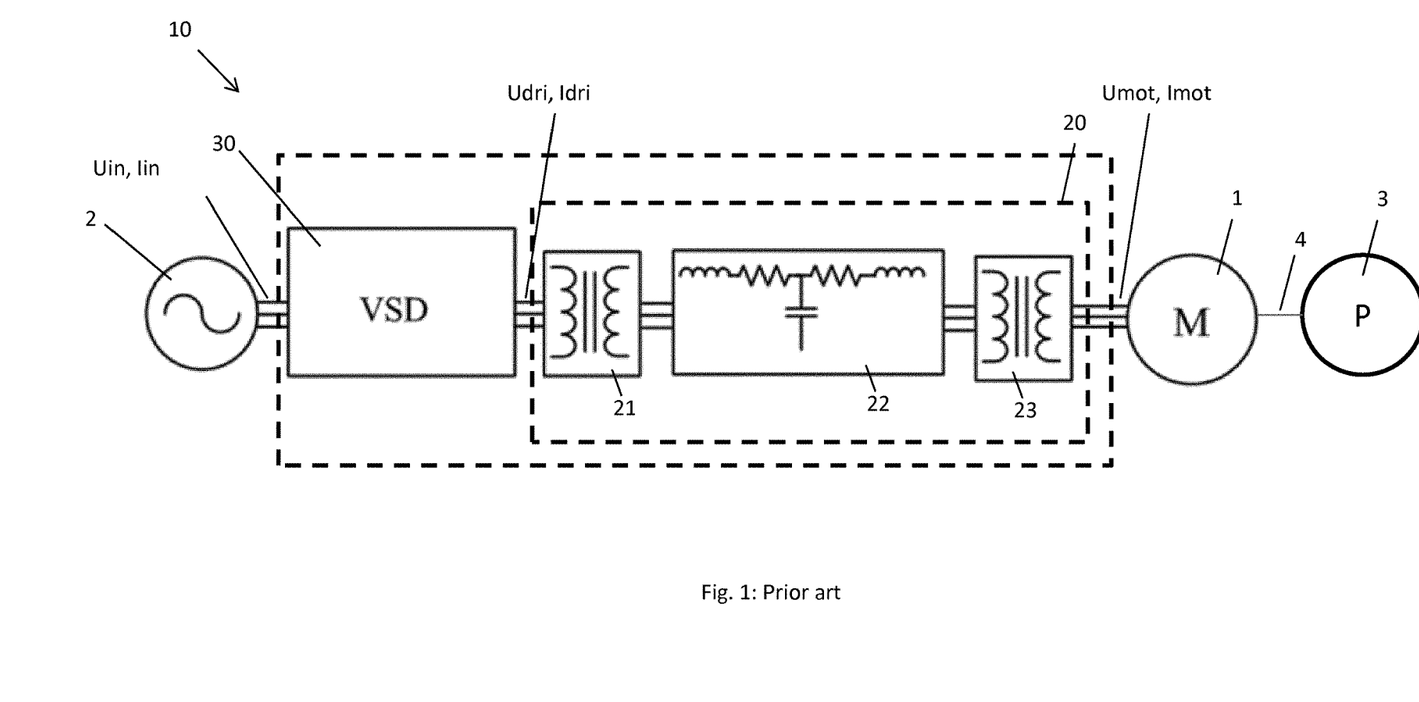
FIG. 1 illustrates a prior art system for operating a variable speed motor via a power transmission device.

In subsea applications, the VSD is provided topside, often relatively close to the power source. Between the VSD and the motor a power transmission device is provided for transmission of power to the motor from the power source. In FIG. 1, this situation is illustrated schematically. Here the power transmission device is shown with a first transformer, a step-up transformer, connected topside between the VSD and a cable, and a second transformer, a step-down transformer, is connected subsea between the cable and the motor. This configuration, with a relatively long distance between the VSD and the motor, is often referred to as a long step-out configuration.

In FIG. 1, the transformers and cables are illustrated with their electrical equivalents comprising inductors, resistors and capacitors.

It is challenging to provide proper power supply and to control the subsea motor in such a configuration, due to the effect of the long cable and the transformers between the topside VSD and the subsea motor. Not only do these components introduce a voltage drop, resulting in a lower voltage reaching the motor than the one produced by the VSD, but more importantly they also cause a current loss or current gain on the motor side. These effects need to be compensated for, so that desirable mechanical performance (i.e. proper torque on the motor shaft) can be achieved.

The object of the invention is to improve the control of a subsea motor. In particular, the object of the invention is to improve the control of a subsea motor when a variable speed drive is used to supply power to an electric motor via a power transmission device.

Another object of the invention is to avoid or reduce dependency of subsea sensors, while still being able to operate the motor and to monitor the status of the motor.

SUMMARY OF THE INVENTION

The present invention relates to a method of operating a variable speed motor drivingly connected to a multiphase pump via a shaft, comprising the steps of:
providing a power transmission device for transmission of power to the variable speed motor from a power source;
providing a first controller between the power source and the power transmission device for controlling the variable speed motor;
calculating, in the first controller, a speed parameter n representative of a motor speed $n_{mot}$;
receiving, in the first controller, a torque reference Tref;
providing a second controller in communication with the first controller for compensation of the effect of the power transmission device, where the second controller comprises a representation of a compensation torque $\Delta T_{map}$ as a function of a mapped torque parameter $T_{map}$ and a mapped speed parameter $n_{map}$;
arranging the second controller to receive the torque reference $T_{ref}$ and the speed parameter from the first controller;
calculating, in the second controller, the compensation torque $\Delta T_{map}$ for the speed parameter and torque reference $T_{ref}$ based on the said representation;
arranging the first controller to receive the compensation torque $\Delta T_{map}$ from the second controller;
controlling, based on the received compensation torque $\Delta T_{map}$, the variable speed motor to keep the difference between the torque reference Tref and the shaft torque $T_{mot}$ as small as possible.

The first controller may be a variable speed drive. The first controller may be operating the motor under torque control, i.e. to keep the torque constant.

The second controller may be a separate controller having a digital signal processor provided in communication with the first controller. The second controller may be a programmable logic array (a PLC). The second controller may also be implemented as one or more separate control blocks within the first controller, where the control block(s) are interacting with the main controller functions of the first controller.

The method may further achieve an improved monitoring of the motor current and motor voltage. In order to achieve this, the method comprises the steps of:
calculating, in the first controller, a first current parameter representative of a first motor current Iq,mot;
calculating, in the first controller, a second current parameter representative of a second motor current Id,mot;
arranging the second controller to receive the first and second current parameters from the first controller;
calculating, in the second controller, a first compensation current based on the compensation torque $\Delta T_{map}$ divided by a torque constant;
calculating, in the second controller, a second compensation current based on a representation of the second compensation current as a function of the speed parameter;
calculating, in the second controller, an estimated motor current Iest based on the first and second current parameters and the first and second compensation currents;
outputting the estimated motor current Iest from the second controller.

The estimated motor current Iest may be calculated as:

$$I_{est} = \sqrt{(Id + \Delta Id)^2 + (Iq + \Delta Iq)^2} \qquad (4)$$

Hence, also here the representation of the compensation torque $\Delta T_{map}$ as a function of a mapped torque parameter $T_{map}$ and a mapped speed parameter $n_{map}$ is used.

The estimated motor voltage Uest may be estimated by performing the step of calculating, in the second controller, an estimated motor voltage Uest based on the first and second motor current parameters, the speed parameter, and the stator resistance, the stator d-inductance, the stator q-inductance and the flux linkage of the variable speed motor.

The stator resistance, the stator d-inductance, the stator q-inductance and the flux linkage of the variable speed motor are properties of the motor and can be obtained from the producer of the motor or they can be measured or calculated from measurements on the motor.

The estimated motor voltage Uest may be calculated as:

$$U_{est} = \sqrt{\begin{array}{c}(Np*pi/30*n*\Psi m + R_s(I_q + \Delta I_q) + X_{sd}(i_d + \Delta I_d))^2 + \\ (-R_s(i_d + \Delta I_d) + X_{sq}(I_q + \Delta I_q))^2\end{array}} \quad (5)$$

The representation of the compensation torque ΔTmap may be provided by performing the following steps:
 providing a measurement set-up of the first controller, the power transmission device and the motor;
 measuring the reference torque $T_{ref}$ of the first controller, the speed nmot of the motor and a motor torque $T_{mot}$ of the motor at different operating points;
 calculating the representation of the compensation torque ΔTmap as a function of the reference torque $T_{ref}$, the mapped torque parameter $T_{map}$ and the mapped speed parameter $n_{map}$ based on said measurements;
 storing the representation compensation torque ΔTmap in the second controller.

The first controller, the power transmission device and the motor used in the measurement set-up are those used for driving the multiphase pump via the shaft.

The representation of the compensation torque ΔTmap may also be provided by a simulation model which represents the actual system, i.e. the motor and the power transmission device.

The representation of the second compensation current as a function of the speed parameter may be provided by performing the following steps:
 using the measurement set-up of the first controller, the power transmission device and the motor;
 calculating the second compensation current as the difference between the second motor current Id,mot and the second current parameter as a function of the speed nmot of the motor at different operating points;
 calculating the representation of the second compensation current as a function of the speed parameter based on said measurements;
 storing the representation of the second compensation current in the second controller.

The torque reference Tref is received from a memory in the first controller. The torque reference may be a constant reference, a time-variating reference etc. The torque reference may be received from a process controller provided in communication with the first controller, for example the process controller controlling the pumping process of the multiphase fluid.

The present invention also relates to a system for operating a variable speed motor drivingly connected to a multiphase pump via a shaft, the system comprising:
 a power transmission device for transmission of power to the variable speed motor from a power source;
 a first controller for controlling the variable speed motor, where the first controller is provided between the power source and the power transmission device;
where the first controller calculates a speed parameter representative of a motor speed $n_{mot}$;
where the first controller receives a torque reference Tref;
where the system further comprises a second controller in communication with the first controller for compensation of the effect of the power transmission device,
where the second controller comprises a representation of a compensation torque $\Delta T_{map}$ as a function of a mapped torque parameter $T_{map}$ and a mapped speed parameter $n_{map}$;
where the second controller is arranged to receive the torque reference Tref, and the speed parameter from the first controller;
where the second controller is configured to calculate the compensation torque $\Delta T_{map}$ for the speed parameter and torque reference $T_{ref}$ based on the said representation;
where the first controller is configured to receive the compensation torque $\Delta T_{map}$ from the second controller;
where the first controller, based on the received compensation torque $\Delta T_{map}$, is configured to control the variable speed motor to keep the difference between the torque reference Tref and the shaft torque $T_{mot}$ as small as possible.

In the above system, the first controller is configured to calculate a first current parameter Id and a second current parameter Iq; where
 the second controller is arranged to receive the first and second current parameters from the first controller;
 the second controller is configured to calculate a first compensation current ΔId based on the compensation torque $\Delta T_{map}$ divided by a torque constant;
 the second controller is configured to calculate a second compensation current ΔIq based on a representation of the second compensation current as a function of the speed parameter;
 the second controller is configured to calculate an estimated motor current Iest based on the first and second current parameters and the first and second compensation currents;
 the second controller is configured to output the estimated motor current Iest.

In the above system, the second controller is configured to calculate the estimated motor current Iest as:

$$I_{est} = \sqrt{(Id+\Delta Id)^2 + (Iq+\Delta Iq)^2} \quad (4)$$

In the above system, the second controller is configured to calculate an estimated motor voltage Uest based on the first and second motor current parameters Iq, Id, the speed parameter n, and the stator resistance Rs, the stator d-inductance Xsd, the stator q-inductance Xsq and the flux linkage Ψm of the variable speed motor, where the second controller is configured to calculate the estimated motor voltage Uest as:

$$U_{est} = \sqrt{\begin{array}{c}(Np*pi/30*n*\Psi m + R_s(I_q + \Delta I_q) + X_{sd}(i_d + \Delta I_d))^2 + \\ (-R_s(i_d + \Delta I_d) + X_{sq}(I_q + \Delta I_q))^2\end{array}} \quad (5)$$

DETAILED DESCRIPTION

Embodiments of the invention will be described in detail with reference to the enclosed drawings, where.

In order to simplify the understanding of the description below, a list of references used in the description and drawing are given below:

LIST OF REFERENCES USED IN THE DESCRIPTION AND CLAIMS

Parameters "Available" (i.e. Measured or Computed) in VSD:
speed parameter n
torque reference Tref
first current parameter Iq
second current parameter Id
output voltage Udri to motor
output current Idri to motor
$E=\omega \Psi m$, where $\omega=Np*pi/30*n$, where Np is the number of pole pairs of the motor
  Physical Parameters of Motor:
motor voltage Umot
first motor current Iq,mot
second motor current Id,mot
motor current $Imot=sqrt(Iq,mot^2+Id,mot^2)$
motor speed $n_{mot}$
shaft torque $T_{mot}$
stator resistance Rs
stator d-inductance Xsd
stator q-inductance Xsq
flux linkage $\Psi m$
number of pole pairs Np of the motor
  Parameters in Representation Map:
compensation torque $\Delta T_{map}$
mapped torque parameter $T_{map}$
mapped speed parameter $n_{map}$
mapped reference torque $T_{ref,map}$
  Parameters Calculated by Second Controller (in Addition to Those in Map)
first compensation current $\Delta Iq$
second compensation current $\Delta Id$
estimated motor current Iest
estimated motor voltage Uest Reference is now made to FIG. 1. Here, a prior art system 10 for operating a variable speed motor 1 is shown. The motor 1 drivingly connected to a multiphase pump 3 via a shaft 4. The motor 1 is powered by a power source 2, and is controlled by a first controller 30 connected between the motor 1 and the power source 2.

In addition, a power transmission device 20 is connected between the first controller 30 and the motor 1, for transmission of power from the power source 2 via the first controller 30 to the motor 1. The power transmission device 20 may comprise a step-up transformer 21, a cable 22 and a step-down transformer 23. In alternative embodiments, the power transmission device 20 may comprise only the cable 22.

The motor 1 is in the present embodiment a variable speed motor 1, as mentioned in the introduction. The first controller 30 is a variable speed drive, for example Siemens Perfect Harmony GH180. This type of controller may control a wide range of different types of motors. The first controller 30 comprises a communication interface (Profibus, Modbus etc) which can communicate the status of the controller itself, the status of the motor, for monitoring industrial processes. The communication interface also offers a possibility to manipulate variables, for example for connection of sensors to the first controller 30 etc. It should be noted that the first controller 30 is considered to be prior art, which will not be described here in detail.

As indicated in FIG. 1, the power supply 2 supplies an input voltage and current Uin, Iin to the system 10. The first controller 30 outputs a drive voltage and current Udri, Idri for driving the motor 1, while the motor 1 receives the motor voltage Umot and motor current Imot. Due to the power transmission device 20, the motor voltage Umot is not equal to the drive voltage Udri and the motor current Imot is not equal to the drive current Idri.

Figure 2:
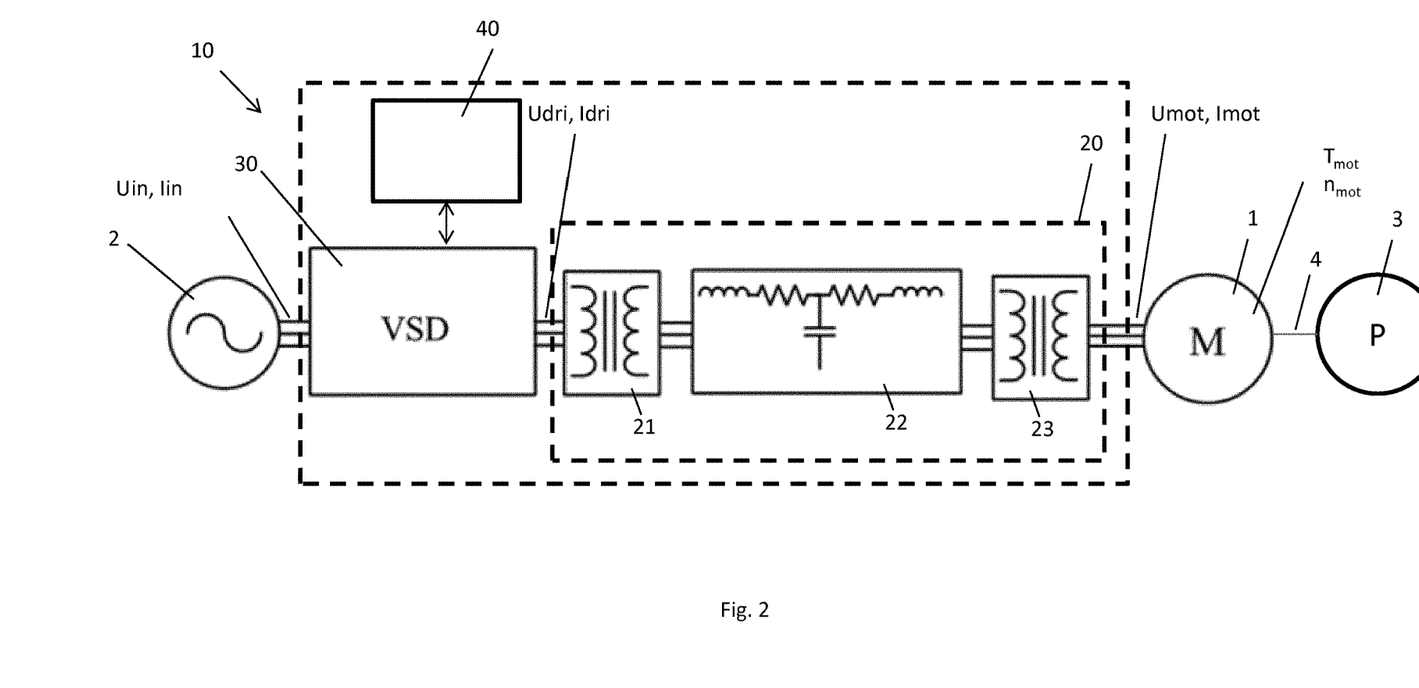
FIG. 2 illustrates a first embodiment of the system according to the invention.

Reference is now made to FIG. 2.

In this embodiment, the only connection between the first controller 30 and the motor 1 is the power transmission device 20. The only real-time data about the motor 1 being available to the first controller 30 is its output voltage Udri and its output current Idri. Consequently, there are no speed sensors for sensing the speed of the motor, there are no voltage/current sensors for sensing the motor voltage/current Umot/Imot and there are no torque sensor for measuring the motor torque $T_{mot}$.

The reasons for this are that such subsea sensors are expensive and that one or several signal lines would add to the cost of the power transmission device 20. Another reason is that the control of the motor 1 should not be dependent of such sensors—dependency of sensors increases the risk of a shut down of the subsea pump and hence stopping the production of the subsea facility in which the pump is used.

The first controller 30 is able to calculate a speed parameter n which is representative of the motor speed $n_{mot}$, where the motor speed $n_{mot}$ is the real speed of the motor.

The reference torque Tref is representative for a value for the actual motor torque Tmot. The second controller aims to improve the accuracy of this representation.

The first controller receives the torque reference Tref. The main object of the first controller 30 is to control the motor 1 to keep the difference between the torque reference Tref and the real shaft torque Tmot of the motor as small as possible. As is known, the shaft torque Tmot is approximately proportional to the motor current Imot. Hence, since the driving current Idri is not equal to the motor current Imot, it is not possible for the first controller 30 to calculate the motor torque Tmot accurately.

The torque reference Tref can be a fixed value stored in a memory provided in the first controller 30. Alternatively, the torque reference Tref can be received by the first controller 30 from a process controller (not shown) provided in communication with the first controller 30, for example the process controller of the pump.

Figure 3:
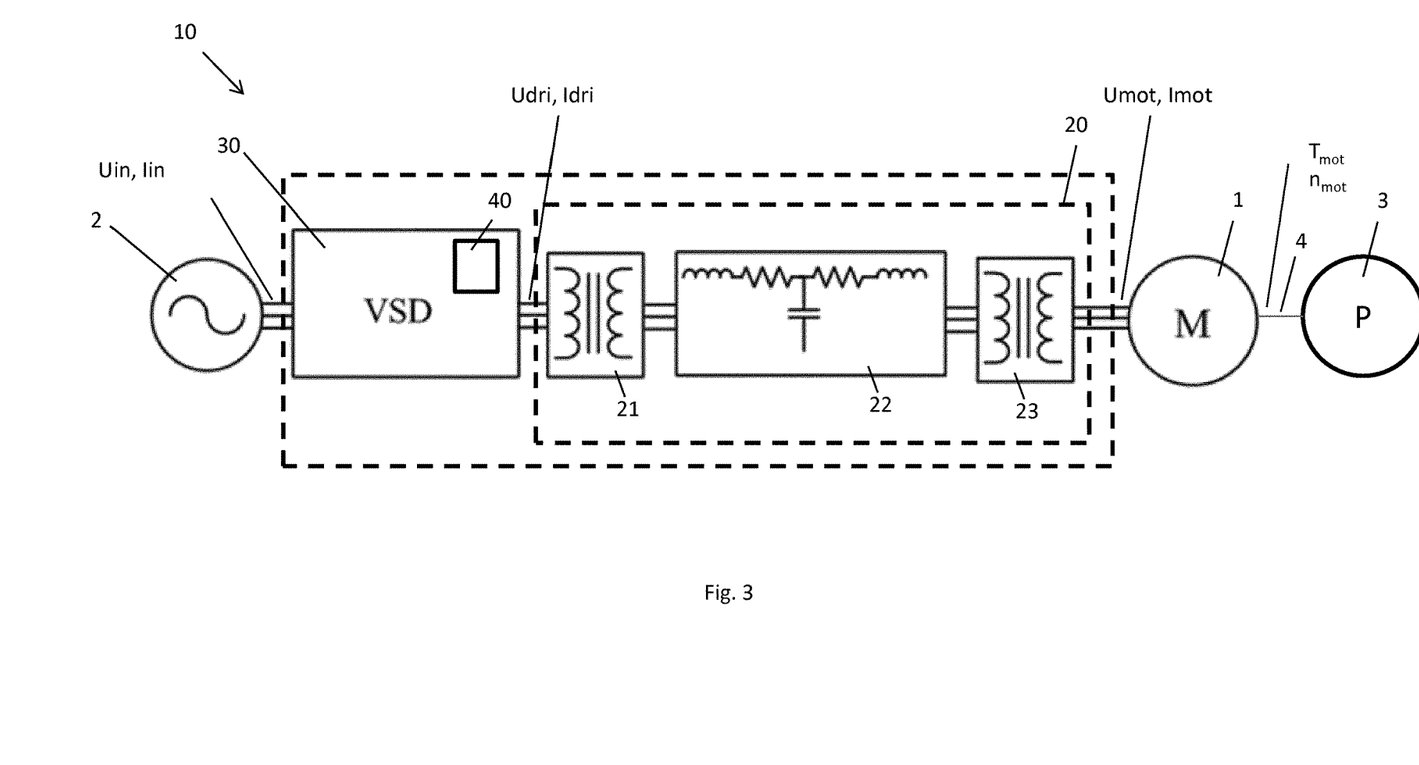
FIG. 3 illustrates a second embodiment of the system according to the invention.

The system 10 further comprises a second controller 40 in communication with the first controller 30. In FIG. 2, it is shown that the second controller 40 is provided as a separate controller external of the first controller 30. The second controller 40 may here be a programmable logic controller (a PLC) connected to the first controller via a data bus (such as Profibus, Modbus etc). In FIG. 3, it is shown that the second controller 40 is provided inside, i.e. as a part of, the first controller 30. The first controller 30 here allows separate control blocks to be added to itself, where these control blocks may communicate with the other control blocks in the first controller 30.

Figure 4:
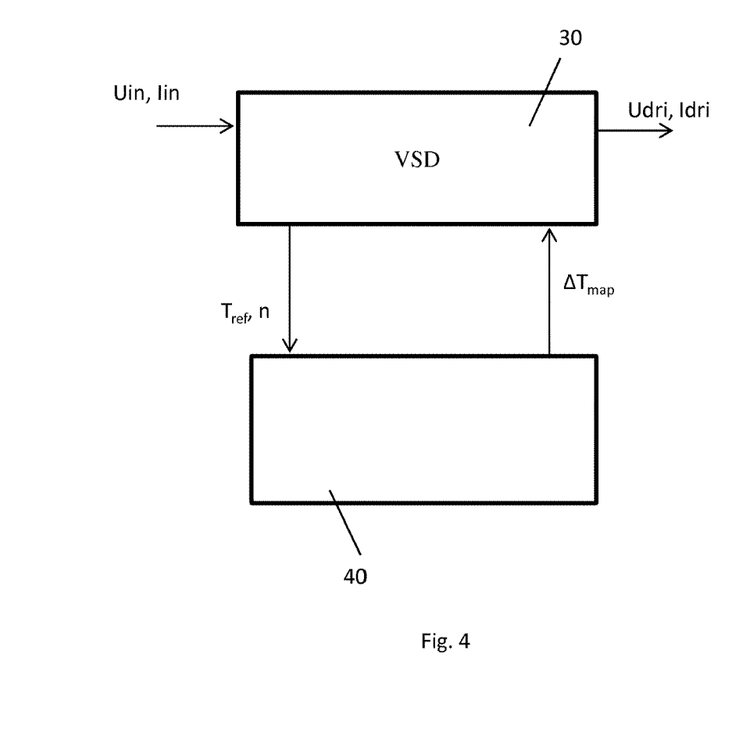
FIG. 4 illustrates schematically the parameters transferred between the first and second controller during the torque compensation.
Figure 5:
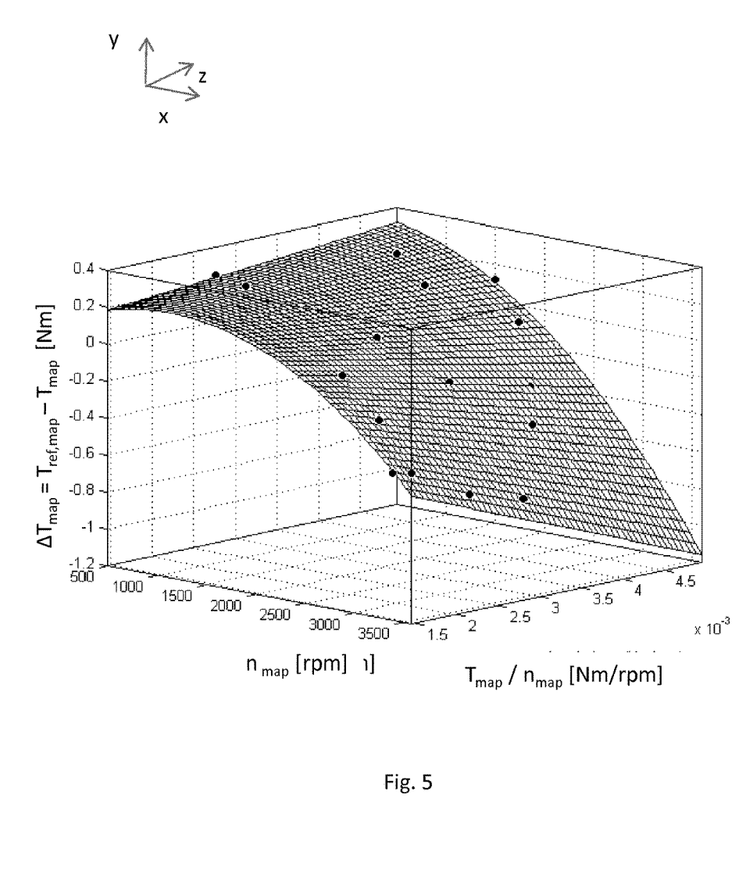
FIG. 5 illustrates the representation of the compensation torque as a function of the motor shaft torque and the motor speed.

Reference is now made to FIGS. 4 and 5. The purpose of the second controller 40 is to compensate for the effect of the power transmission device 20. This is achieved by providing a representation or so-called representation map of a compensation torque $\Delta T_{map}$ as a function of a mapped torque parameter $T_{map}$, a mapped reference torque $T_{ref,map}$, and a mapped speed parameter $n_{map}$. The representation map of the compensation torque $\Delta T_{map}$ is stored in, and used by, the second controller 40. This will be explained in detail below.

During operation, the second controller 40 is arranged to receive the torque reference Tref and the speed parameter n from the first controller 30. The speed parameter n, and possibly also the torque reference Tref may be received continuously or approximately continuously (for example every second, every 1/10 second etc).

The second controller 40 is configured to calculate the compensation torque $\Delta T_{map}$ for the speed parameter n and torque reference $T_{ref}$ based on the said representation. It should be noted that even if four variables (compensation torque $\Delta T_{map}$, mapped torque parameter $T_{map}$, mapped speed parameter $n_{map}$, and mapped reference torque $T_{ref,map}$) are shown in the representation map, there is a direct relation between the compensation torque $\Delta T_{map}$, the mapped torque parameter $T_{map}$, and the mapped reference torque $T_{ref,map}$, indicated in FIG. 5 as $$\Delta T_{map} = T_{ref,map} - T_{map} \quad (1)$$

Hence, by knowing a value for Tref ($T_{ref,map}$ in the map) and n (nmap in the map), it is possible to use the representation to find a value for Tmap and hence also a value for $\Delta T_{map}$.

When the compensation torque $\Delta T_{map}$ has been found in the second controller, the first controller 30 is configured to receive the compensation torque $\Delta T_{map}$ from the second controller 40, as indicated in FIG. 4.

The compensation torque $\Delta T_{map}$ is then used by the first controller to compensate for the power transmission device 20. As mentioned above, the first controller is configured to control the variable speed motor 1 to keep the difference between the torque reference Tref and the shaft torque Tmot as small as possible.

Again, the first controller 30 does not know the exact motor torque Tmot.

Tref is representative of Tmot. When the representation map is used, this representation becomes accurate. The torque reference Tref plus the compensation torque ΔTmap gives an 'effective' torque which encompasses Tmot and the effect of the transmission system.

In the following, the representation map shown in FIG. 5 will be described more in detail. Initially, a measurement set-up of the first controller 30, the power transmission device 20 and the motor 1 will be provided. The measurement set-up is provided by a medium voltage measurement setup using the GH180 VSD from Siemens, medium-voltage topside and subsea transformers by Siemens, a medium-voltage umbilical from Nexans and a Mark 1 PM motor-pump from FMC-Sulzer.

Hence, the representation map in FIG. 5 will be achieved by performing measurements on the same equipment or equipment of the same type as the equipment being installed subsea. Now, the reference torque $T_{ref}$ of the first controller 30, the speed $n_{mot}$ of the motor 1 and the motor torque Tmot of the motor 1 will be measured at different operating points, i.e. for a variety of relevant values for the reference torque $T_{ref}$, the motor speed $n_{mot}$ and the motor torque Tmot.

Then, these values are used to calculate the above representation map. In the representation map, the subscript "map" is used, as some approximations will be performed on the measured values in the representation map. For example, in the present embodiment, a curve fitting algorithm has been used on the measurements in order to compute the three-dimensional function of ΔTmap (y-axis) as a function of nmap (x-axis) and Tmap/nmap (z-axis), where ΔTmap=Tref,map−Tmap as in equation 1 above.

In a final step, the representation of the compensation torque ΔTmap is stored in the second controller (40).

Accordingly, the measured values for Tref is represented by Tref,map in the representation map, the measured values for Tmot is represented by Tmap in the map and the measured values for $n_{mot}$ is represented by nmap in the map.

In an alternative embodiment, the three-dimensional function of ΔTmap could also have been expressed as a function of nmap and Tmap.

In yet an alternative embodiment, the representation may be stored as values or coordinates, where approximation calculations are performed in the second controller 40 during operation of the present invention.

In yet an alternative embodiment, the representation map could be provided as values for $n_{map}$ along the x-axis, values for Tmap along the z-axis and values for Tref along the y-axis. Here, a value for Tmap can be found directly in a first step during operation based on the received speed parameter n and reference torque Tref received in the second controller 40 from the first controller 30, and in a second step, a value for ΔTmap can be calculated as the difference between Tref and Tmap.

In yet an alternative embodiment, the representation can be achieved by using a digital modelling tool instead of using a full measurement set-up. Here a digital model of the power transmission device 20 and the motor 1 is used together with the first controller 30, and the variety of relevant values for the reference torque $T_{ref}$, the motor speed $n_{mot}$ and the motor torque Tmot are achieved by running simulations of this model.

Figure 6:
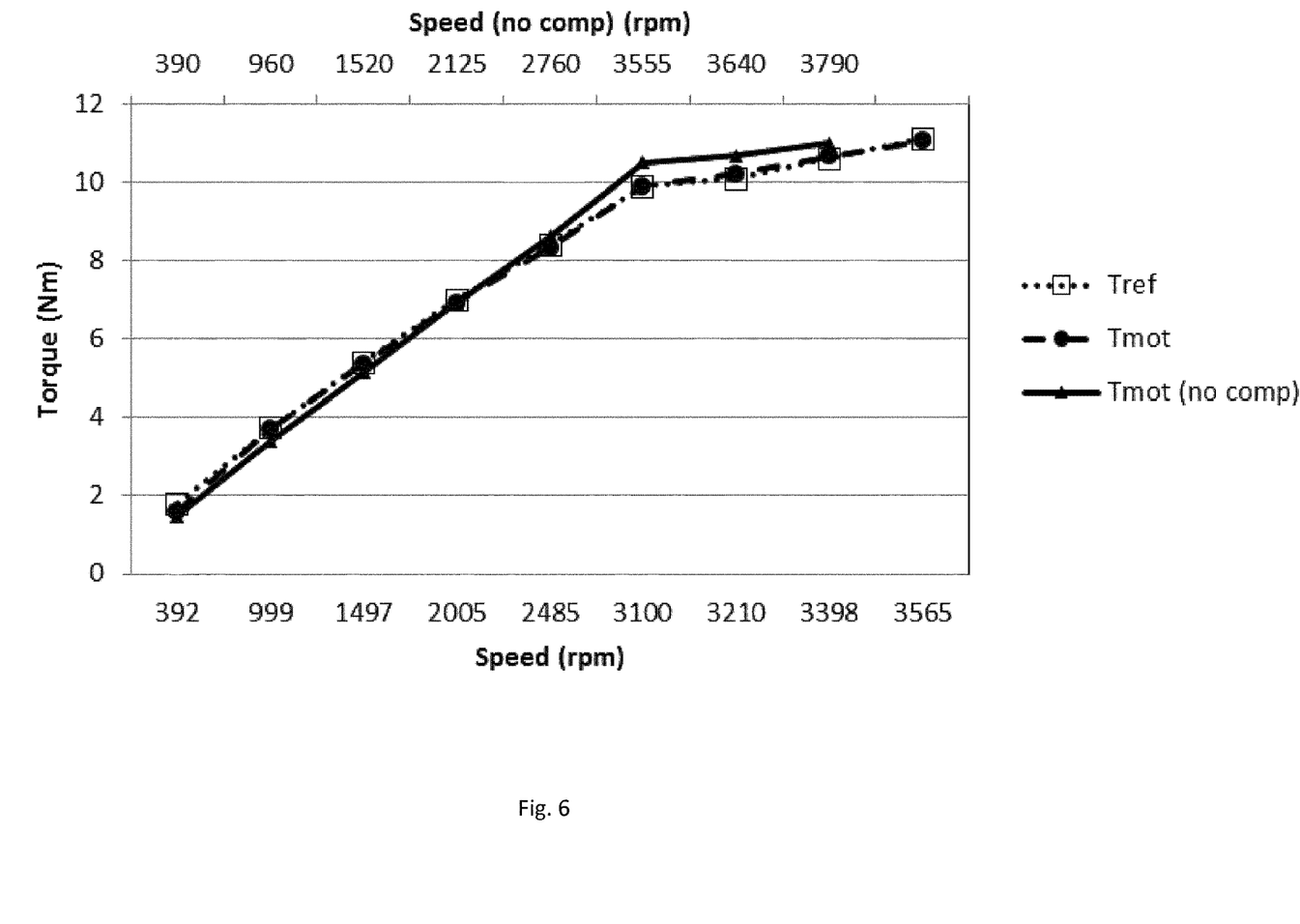
FIG. 6 illustrates a comparison of the reference torque, the compensated motor torque and the non-compensated motor torque as a function of the motor speed.

Reference is now made to FIG. 6. Here, curves of the motor torque Tmot without using the present invention (indicated as "Tmot (no comp)"), the reference torque Tref and the motor torque Tmot with using the present invention have been shown as functions of the motor speeds. Here, it is shown that the curve for the motor torque Tmot with using the present invention is closer to the reference torque Tref than the motor torque "Tmot (no comp)" achieved when not using the present invention. Consequently, it is shown that a better torque control of the motor is achieved.

The new torque reference equal to $T_{ref}+\Delta T$ is communicated to the first controller 30. This new torque reference causes a sequence of results: a modified voltage—both magnitude and phase—at the output of the first controller 30, and at the motor terminals and hence modified speed and shaft torque on the motor. The effect is that the pump operates at the desired operating point. Hence, the above described system and method modifies the drive output, so that the effect of the cable and the transformers is compensated for and the desired shaft torque is achieved.

A second embodiment will now be described. As mentioned in the introduction above, it is also desired to monitor the status of the motor without the use of subsea sensors. Two important parameters of the motor are the motor voltage Umot of the motor terminals and the motor current Imot of the motor terminals. As mentioned above, the output voltage Udri from the first controller to the motor and the output current Idri to the motor are not considered representative for the motor voltage Umot and the motor current Imot due to the effect of the power transmission device 20.

Below, it is described how an estimated motor current Iest and an estimated motor voltage Uest can be outputted from the second controller 40, where this estimated current/voltage are more accurate than the output current/voltage from the first controller 30.

As is known to the skilled person, the motor current of such a motor can be represented as vectors in a (d, q) coordinate system with orthogonal components along a d-axis (direct axis) and a q-axis (quadrature axis). The first controller 30 also uses this d-q representation during its operation.

Hence, the first controller 30 calculates a first current parameter Iq representative of an actual first motor current Iq,mot. The first motor current Iq,mot corresponds to the quadrature axis current of the motor.

The first controller 30 also calculates a second current parameter Id representative of an actual second motor current (Id,mot). The second motor current Id,mot corresponds to the direct axis current of the motor.

The total actual motor current Imot is given by the formula $$I_{mot} = \sqrt{I_{q,mot}^2 + I_{d,mot}^2} \quad (2)$$

Figure 7:
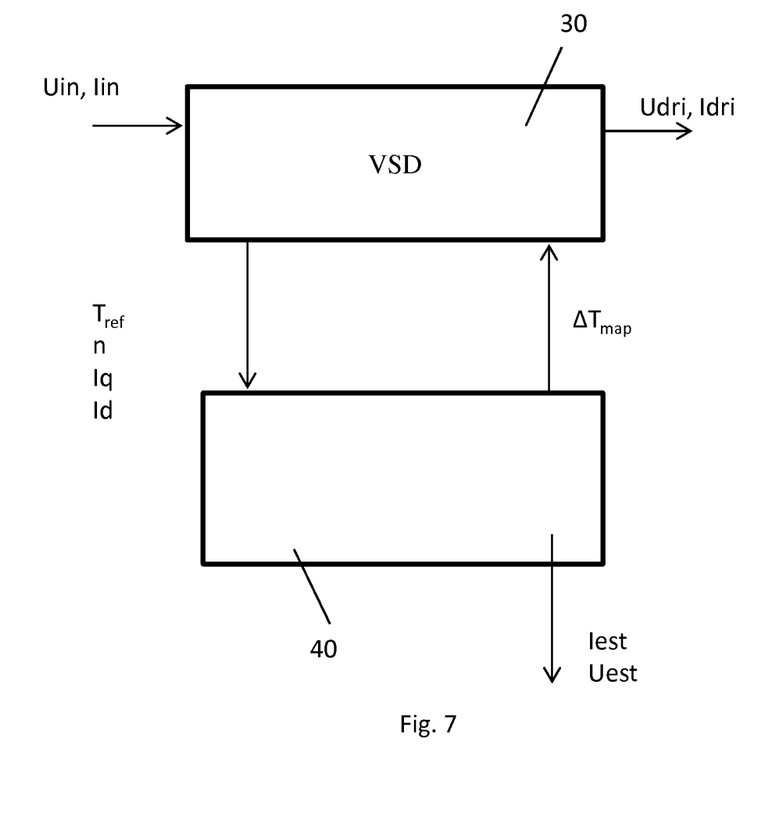
FIG. 7 illustrates schematically the parameters transferred between the first and second controller during the motor voltage and current estimation.

Reference is now made to FIG. 7. Here it is shown that the second controller 40 is arranged to receive the first and second current parameters Iq, Id from the first controller 30, together with the speed parameter n and the torque reference Tref.

During operation of the motor, the second controller 40 calculates a first compensation current ΔIq based on the compensation torque $\Delta T_{map}$ divided by a torque constant $K_T$. In the present embodiment of the invention, the torque constant $K_T$ was calculated as 1.53 Nm/A.

During operation of the motor, the second controller 40 also calculates a second compensation current ΔId based on a representation of the second compensation current ΔId as a function of the speed parameter n. It has been found that the second compensation current ΔId varies with the motor speed, but that it is similar for different loads. Hence, a single-variable representation has been found sufficient.

Figure 8:
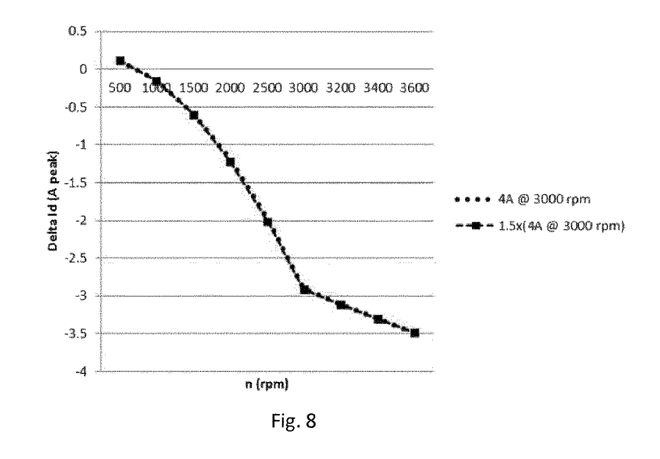
FIG. 8 illustrates a representation of the second compensation current as a function of the motor speed.

The representation of the second compensation current ΔId will be described further in detail below by referring to FIGS. 8 and 9. Also the measurement set-up of the first controller 30, the power transmission device 20 and the motor 1 is used here.

The first and second motor current parameters Iq, Id are measured in the first controller 30 while the first and second motor currents Iq,mot, Id,mot are calculated at different operating points.

The first motor current Iq,mot is calculated as Iq,mot=Iq+ΔIq=Iq+ΔTmap/$K_T$. The second motor current Id,mot is calculated according to the above formula (2) as Id,mot=sqrt(Imot²−Iq,mot²)

Then, the second compensation current ΔId is calculated as the difference between the second motor current Id,mot and the second current parameter Id as a discrete function of the speed $n_{mot}$ of the motor 1. This discrete function ΔId(n) is disclosed in FIG. 8. Here it is also shown that the second compensation current ΔId is almost identical for two different loads on the motor 1.

Figure 9:
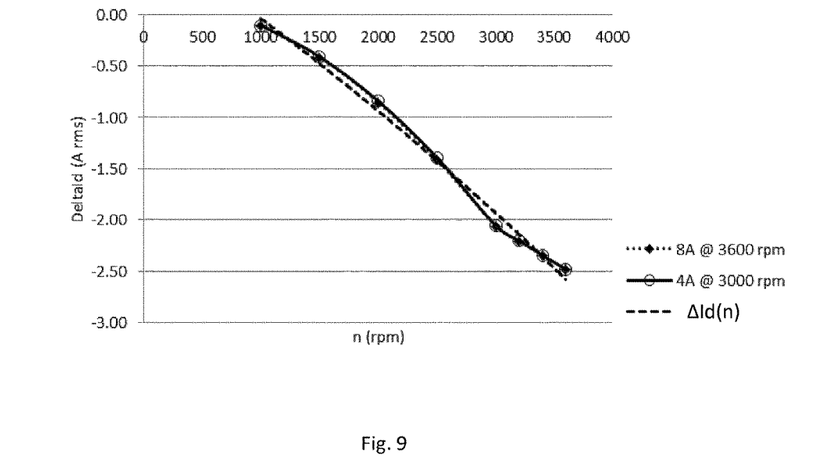
FIG. 9 illustrates a representation of the second compensation current by using a curve-fitting tool and shows the calculation formula for the second compensation current.

Also here, a curve fitting algorithm has been used on the discrete measurements to provide a continuous function ΔId(n), shown with a dashed curve ΔId(n) in FIG. 9. In the present embodiment, the function ΔId(n) is given as $$\Delta Id(n) = 5e\text{-}8 * n^2 - 7.46e\text{-}4 * n + 0.75 \quad (3)$$

Of course, this function will be dependent on the measurement set-up of the first controller 30, the power transmission device 20 and the motor 1, i.e. it must be computed for each application.

The above function ΔId(n) is the representation of the second compensation current ΔId as a function of the speed parameter n. This representation is stored in the second controller 40 and is used by the second controller 40 during the operation of the motor 1.

Based on the first and second current parameters Iq, Id and the first and second compensation currents ΔIq, ΔId, the estimated motor current Iest can be calculated and outputted from the second controller (40) for example for monitoring purposes.

The estimated motor current Iest is then calculated as:

$$I_{est} = \sqrt{(Id + \Delta Id)^2 + (Iq + \Delta Iq)^2} \quad (4)$$

Figure 10:
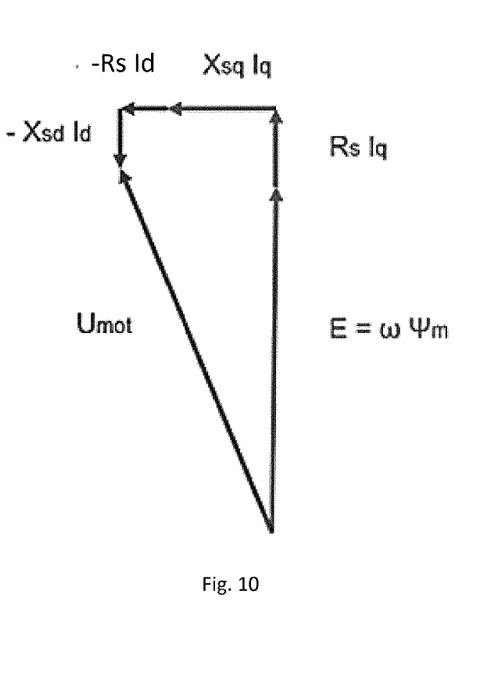
FIG. 10 illustrates the computation of the estimated motor voltage based on the estimated motor current.

Reference is now made to FIG. 10, where a known vector diagram of a motor 1 is shown, and where the motor voltage Umot can be expressed by first and second motor currents Id, Iq, a voltage E and physical properties such as the stator resistance Rs, the stator d-inductance Xsd, the stator q-inductance Xsq and the flux linkage Ψm of the motor. Here, the voltage E=ωΨm, where ω=Np*pi/30*n, where Np is the number of pole pairs of the motor and n is the motor speed.

Consequently, by using the first and second compensated currents ΔIq and ΔId, the estimated motor voltage Uest may be calculated as:

$$U_{est} = \sqrt{(Np*pi/30*n*\Psi m + R_s(I_q + \Delta I_q) + X_{sd}(i_d + \Delta I_d))^2 + (-R_s(i_d + \Delta I_d) + X_{sq}(I_q + \Delta I_q))^2} \quad (5)$$

This formula is also stored in the second controller 40 and is used by the second controller 40 during the operation of the motor 1.

Figure 11:
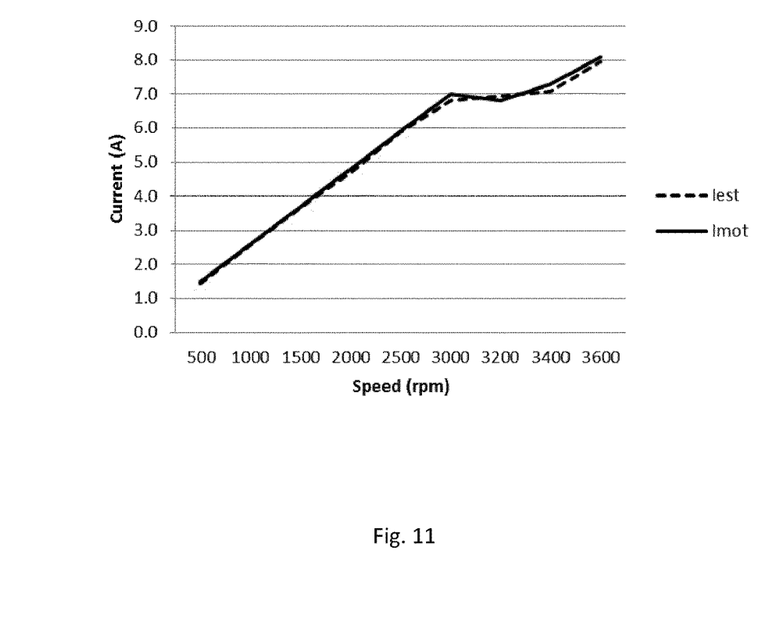
FIG. 11 illustrates a comparison of the estimated motor current and the actual motor current.
Figure 12:
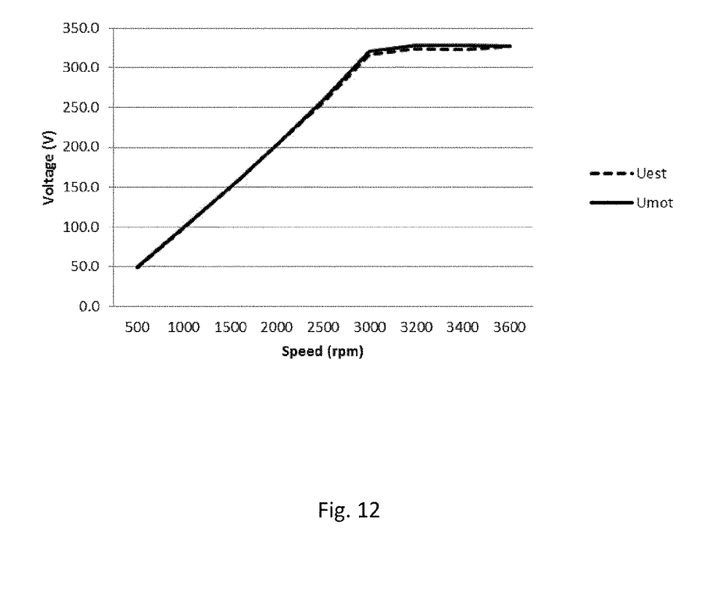
FIG. 12 illustrates a comparison of the estimated motor voltage and the actual motor voltage.

Reference is now made to FIGS. 11 and 12. In FIG. 11 it is shown that the curve for the estimated motor current Iest is close to the actual motor current Imot. In FIG. 12, it is shown that the curve for the estimated motor voltage Uest is close to the actual motor voltage Umot.

The invention claimed is:

1. A method of operating a variable speed motor which is drivingly connected to a multiphase pump via a shaft, the method comprising:
    providing a power transmission device for transmission of power to the variable speed motor from a power source;
    providing a first controller between the power source and the power transmission device for controlling the variable speed motor;
    calculating, in the first controller, a speed parameter (n) which is representative of a motor speed ($n_{mot}$);

receiving, in the first controller, a torque reference (Tref);
providing a second controller in communication with the first controller, wherein the second controller comprises a representation of a compensation torque ($\Delta T_{map}$) as a function of a mapped torque parameter ($T_{map}$) and a mapped speed parameter ($n_{map}$);
arranging the second controller to receive the torque reference ($T_{ref}$) and the speed parameter (n) from the first controller;
calculating, in the second controller, the compensation torque ($\Delta T_{map}$) for the speed parameter (n) and torque reference ($T_{ref}$) based on the said representation;
arranging the first controller to receive the compensation torque ($\Delta T_{map}$) from the second controller; and
controlling, based on the received compensation torque ($\Delta T_{map}$), the variable speed motor to minimize a difference between the torque reference (Tref) and a shaft torque (Tmot) of the motor.

2. The method according to claim 1, further comprising:
calculating, in the first controller, a first current parameter (Iq) representative of a first motor current (Iq, mot);
calculating, in the first controller, a second current parameter (Id) representative of a second motor current (Id, mot);
arranging the second controller to receive the first and second current parameters (Iq, Id) from the first controller;
calculating, in the second controller, a first compensation current ($\Delta Iq$) based on the compensation torque ($\Delta T_{map}$) divided by a torque constant ($K_T$);
calculating, in the second controller, a second compensation current ($\Delta id$) based on a representation of the second compensation current ($\Delta Id$) as a function of the speed parameter (n);
calculating, in the second controller, an estimated motor current (Iest) based on the first and second current parameters (Iq, Id) and the first and second compensation currents ($\Delta Iq$, $\Delta Id$); and
outputting the estimated motor current (Iest) from the second controller.

3. The method according to claim 2, wherein the estimated motor current (Iest) is calculated as:

$$I_{est} = \sqrt{(Id+\Delta Id)^2+(Iq+\Delta Iq)^2}.$$

4. The method according to claim 2 or 3, further comprising:
calculating, in the second controller, an estimated motor voltage (Uest) based on the first and second motor current parameters (Iq, Id), the speed parameter (n), and a stator resistance (Rs), a stator d-inductance (Xsd), a stator q-inductance (Xsq) and a flux linkage ($\Psi m$) of the variable speed motor.

5. The method according to claim 4, wherein the estimated motor voltage (Uest) is calculated as:

$$U_{est} = \sqrt{(Np*pi/30*n*\Psi m + R_s(I_q+\Delta I_q) + X_{sd}(i_d+\Delta I_d))^2 + (-R_s(i_d+\Delta I_d) + X_{sq}(I_q+\Delta I_q))^2}.$$

6. The method according to claim 1, wherein the representation of the compensation torque ($\Delta Tmap$) is obtained by performing the following steps:
providing a measurement set-up of the first controller, the power transmission device and the motor;
measuring the reference torque ($T_{ref}$) of the first controller, the speed ($n_{nmot}$) of the motor and a motor torque (Tmot) of the motor at different operating points;
calculating the representation of the compensation torque ($\Delta Tmap$) as a function of the reference torque ($T_{ref}$), the mapped torque parameter ($T_{map}$) and the mapped speed parameter ($n_{map}$) based on said measurements; and
storing the representation compensation torque ($\Delta Tmap$) in the second controller.

7. The method according to claim 2 or 6, wherein the representation of the second compensation current ($\Delta Id$) as a function of the speed parameter (n) is obtained by performing the following steps:
using the measurement set-up of the first controller, the power transmission device and the motor;
calculating the second compensation current ($\Delta Id$) as the difference between the second motor current (Id,mot) and the second current parameter (Id) as a function of the speed ($n_{mot}$) of the motor at different operating points;
calculating the representation of the second compensation current ($\Delta Id$) as a function of the speed parameter (n) based on said measurements; and
storing the representation of the second compensation current ($\Delta Id$) in the second controller.

8. The method according to claim 1, wherein the torque reference (Tref) is received from a memory in the first controller or from a process controller provided in communication with the first controller.

9. A system for operating a variable speed motor which is drivingly connected to a multiphase pump via a shaft, the system comprising:
a power transmission device for transmission of power to the variable speed motor from a power source;
a first controller for controlling the variable speed motor, wherein the first controller is provided between the power source and the power transmission device;
wherein the first controller is configured to calculate a speed parameter (n) representative of a motor speed ($n_{mot}$);
wherein the first controller is configured to receive a torque reference (Tref);
wherein the system further comprises a second controller in communication with the first controller, the second controller comprising a representation of a compensation torque ($\Delta T_{map}$) as a function of a mapped torque parameter ($T_{map}$) and a mapped speed parameter ($n_{map}$);
wherein the second controller is arranged to receive the torque reference (Tref) and the speed parameter (n) from the first controller;
wherein the second controller is configured to calculate the compensation torque ($\Delta T_{map}$) for the speed parameter (n) and torque reference ($T_{ref}$) based on said representation;
wherein the first controller is configured to receive the compensation torque ($\Delta T_{map}$) from the second controller; and
wherein the first controller, based on the received compensation torque ($\Delta T_{map}$), is configured to control the variable speed motor to minimize a difference between the torque reference (Tref) and the shaft torque (Tmot).

10. The system according to claim 9, wherein:
the first controller is configured to calculate a first current parameter (Iq);
the first controller is configured to calculate a second current parameter (Id);

the second controller is arranged to receive the first and second current parameters (Iq, Id) from the first controller;

the second controller is configured to calculate a first compensation current (ΔIq) based on the compensation torque ($\Delta T_{map}$) divided by a torque constant ($K_T$);

the second controller is configured to calculate a second compensation current (ΔId) based on a representation of the second compensation current (ΔId) as a function of the speed parameter (n);

the second controller is configured to calculate an estimated motor current (Iest) based on the first and second current parameters (Iq, Id) and the first and second compensation currents (ΔIq, ΔId); and the second controller is configured to output the estimated motor current (Iest).

11. The system according to claim 10, wherein second controller is configured to calculate the estimated motor current (Iest) as:

$$I_{est} = \sqrt{(Id+\Delta Id)^2 + (Iq+\Delta Iq)^2}.$$

12. The system according to claim 10 or 11, wherein the second controller is configured to calculate an estimated motor voltage (Uest) based on the first and second motor current parameters (Iq, Id), the speed parameter (n), and a stator resistance (Rs), a stator d-inductance (Xsd), a stator q-inductance (Xsq) and a flux linkage (Ψm) of the variable speed motor, wherein the second controller is configured to calculate the estimated motor voltage (Uest) as:

$$U_{est} = \sqrt{\begin{array}{l}(Np*pi/30*n*\Psi m + R_s(I_q+\Delta I_q) + X_{sd}(i_d+\Delta I_d))^2 + \\ (-R_s(i_d+\Delta I_d) + X_{sq}(I_q+\Delta I_q))^2\end{array}}.$$

\* \* \* \* \*